United States Patent [19]
Chen

[11] Patent Number: 5,896,799
[45] Date of Patent: Apr. 27, 1999

[54] LOCKING MECHANISM FOR THE BLADE OF A COPING SAW

[76] Inventor: Ruey-Zon Chen, No. 261, Jen Hua Road, Ta Li City, Taichung County, Taiwan

[21] Appl. No.: 08/936,523

[22] Filed: Sep. 24, 1997

[51] Int. Cl.⁶ .................................................. B27B 19/02
[52] U.S. Cl. ................................ 83/786; 83/783; 83/784; 83/699.21; 83/662
[58] Field of Search ................................ 83/662, 699.21, 83/783, 784, 786

[56] References Cited

U.S. PATENT DOCUMENTS

| | | | |
|---|---|---|---|
| 4,838,138 | 6/1989 | Rice et al. ................................ | 83/698 |
| 5,016,512 | 5/1991 | Huang ...................................... | 83/783 |
| 5,105,704 | 4/1992 | Chang ...................................... | 83/662 |
| 5,363,733 | 11/1994 | Baird et al. .............................. | 83/786 |

Primary Examiner—Rinaldi I. Rada
Assistant Examiner—T. Anthony Vaughn
Attorney, Agent, or Firm—Bacon & Thomas

[57] ABSTRACT

A coping saw blade is securely mounted to the upper and lower swinging arms of a coping saw by clamping the upper and lower ends of the blade within slits of positioning devices mounted on front portions of the arms. Both flat blades and blades provided with cross end portions may be clamped by the positioning devices.

1 Claim, 4 Drawing Sheets

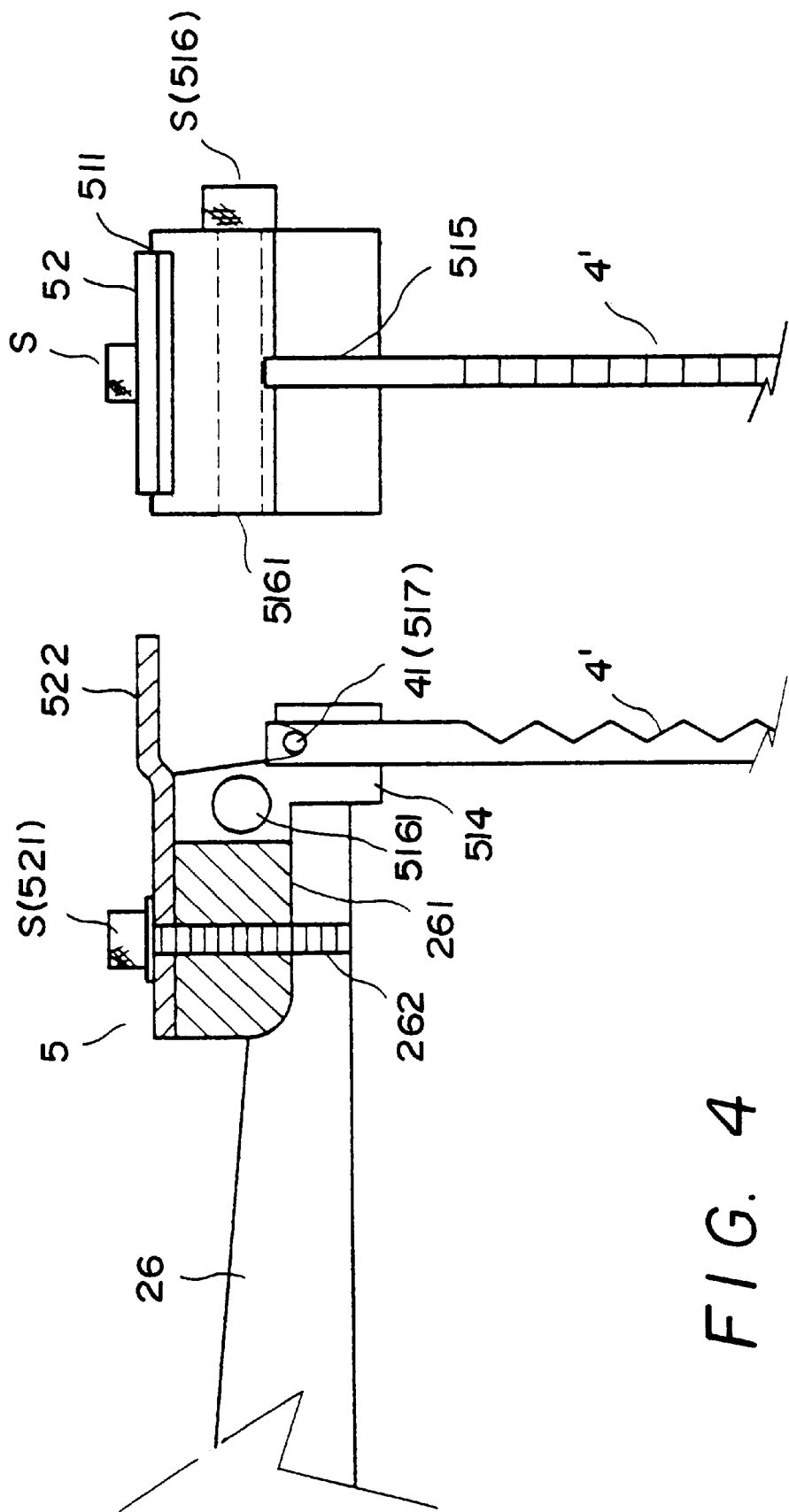

LOCKING MECHANISM FOR THE BLADE OF A COPING SAW

FIELD OF THE INVENTION

The present invention relates to an improved locking mechanism for the blade of a coping saw. The upper and lower swinging arms of the coping saw are provided with upper and lower fixing blocks. A blade can be suitably and properly disposed between the upper and lower fixing blocks. On the other hand, a variant blade which has a cross end portion can also be suitably disposed between the upper and lower fixing blocks. Since the blade or variant blade is fixedly disposed and supported between the upper and lower fixing blocks, an efficient and smooth cutting movement can be therefore achieved and without any possibility of the blade being removed from the blocks.

DESCRIPTION OF PRIOR ART

The existing coping saw is used to cut a designed pattern which features a plurality of curves and contours. Each of those patterns or even a wooden mold for casting can be readily cut by a skilled operator with the existing coping saw. The coping saw machine is indispensable to the industry.

The blade is bridged and supported between the free ends of the upper and lower swinging arms. The upper and lower swinging arms are interconnected at its rear ends by means of a linkage. The coping saw is also provided with a driving motor which is connected with the lower swinging arm by means of the locking block. When the driving motor is triggered, the upper and lower swinging arms are oscillated synchronously and a cutting movement can be performed by the blade.

There are a plurality of conventional coping saws and there are also a plurality of locking methods for attaching the blade to the free ends of the swinging arms. This will also raise an inconvenience to the user. The existing blade can be divided into two categories and the first one has an elongate shape and the second one has a cross portion at both ends. Accordingly, the user shall be careful in selecting the blade for a coping saw since the first and second types of blades are not interchangeable. In case a blade shortage occurs, the complete producing line will be halted, and this will cause a great loss in both production and the purchasing of inventory.

SUMMARY OF THE INVENTION

It is the objective of this invention to provide an improved locking mechanism for a coping saw blade and with which both types of blades can be suitably disposed onto the free ends of the upper and lower swinging arms of the saw.

According to one aspect of the present invention, the blade can be fixedly and firmly disposed and supported between the upper and lower swinging arms by the upper and lower fixing blocks. As a result, the service life of the blade can be therefore prolonged and the cutting work can be smoothly performed.

In order to achieve the objective set forth, the free ends of the upper and lower swinging arms of the coping saw is removably disposed with upper and lower fixing blocks respectively for mounting and bridging a blade therebetween.

In assembling, the upper fixing block is attached to the upper swinging arm by the engagement between the lower recessed reference surface of the upper fixing block and the reference surface of the upper swinging arm. Then an upper pressing tab is fixedly seated into the upper recessed reference surface and finally a set locking screw is applied and passed through the through hole, the shaped hole of the upper fixing block and finally locked into the threaded hole of the upper swinging arm. Similarly, the lower fixing block is fixedly attached to the lower swinging arm by the engagement between the upper recessed reference surface of the lower fixing block and the reference surface of the lower swinging arm. The lower pressing tab is then fixedly seated onto the lower recessed reference surface and then a set locking screw applied is and passed through the through hole of the lower pressing tab, the shaped hole of the lower fixing block and finally locked into the threaded hole of the lower swinging arm.

When both the upper and lower fixing blocks are properly assembled, the blade can be suitably disposed between the slit of the upper fixing block and the slit of the lower fixing block. Then a locking screw is suitably passed through the traverse hole of the slit and engaged into the threaded hole. As a result, the upper end of the blade is fixedly attached to the upper fixing block. Similarly, another locking screw is applied and which is passed through the traverse hole of the slit and is finally engaged into the threaded hole. As a result, the lower end of the blade is fixedly attached to the lower fixing block.

In case a variant of the blade which has a cross portion at both ends is used, it can be also attached to the upper and lower fixing blocks. In mounting, the upper end of the blade is disposed within the slit such that the cross end is firmly seated onto the upper concave portion. Then a locking screw is applied and which passes through the through hole of the upper block and finally locked into the threaded hole. As a result, the upper end of the variant blade can be suitably supported and locked. Similarly, the lower end of the variant blade is also attached to the lower fixing block in the same manner as the upper end. By this arrangement, the variant blade is fixedly bridged between the upper and lower fixing blocks. By this arrangement, since the variant blade can be fixedly and firmly supported between the upper and lower fixing blocks, the oscillated cutting movement of the variant blade can be more efficiently and smoothly performed without any possibility of removal therefrom.

As a result, the existing blades can be suitably disposed and supported between the free ends of the upper and lower ends of the upper and lower swinging arms for cutting movement.

BRIEF DESCRIPTION OF THE DRAWINGS

In order that the present invention may more readily be understood the following description is given, merely by way of example with reference to the accompanying drawings, in which:

FIG. 4 is a partial, cross sectional view, including front and right side elevational views, of the locking mechanism.

DETAILED DESCRIPTION OF THE PREFERRED EMBODIMENT

Figure 1:
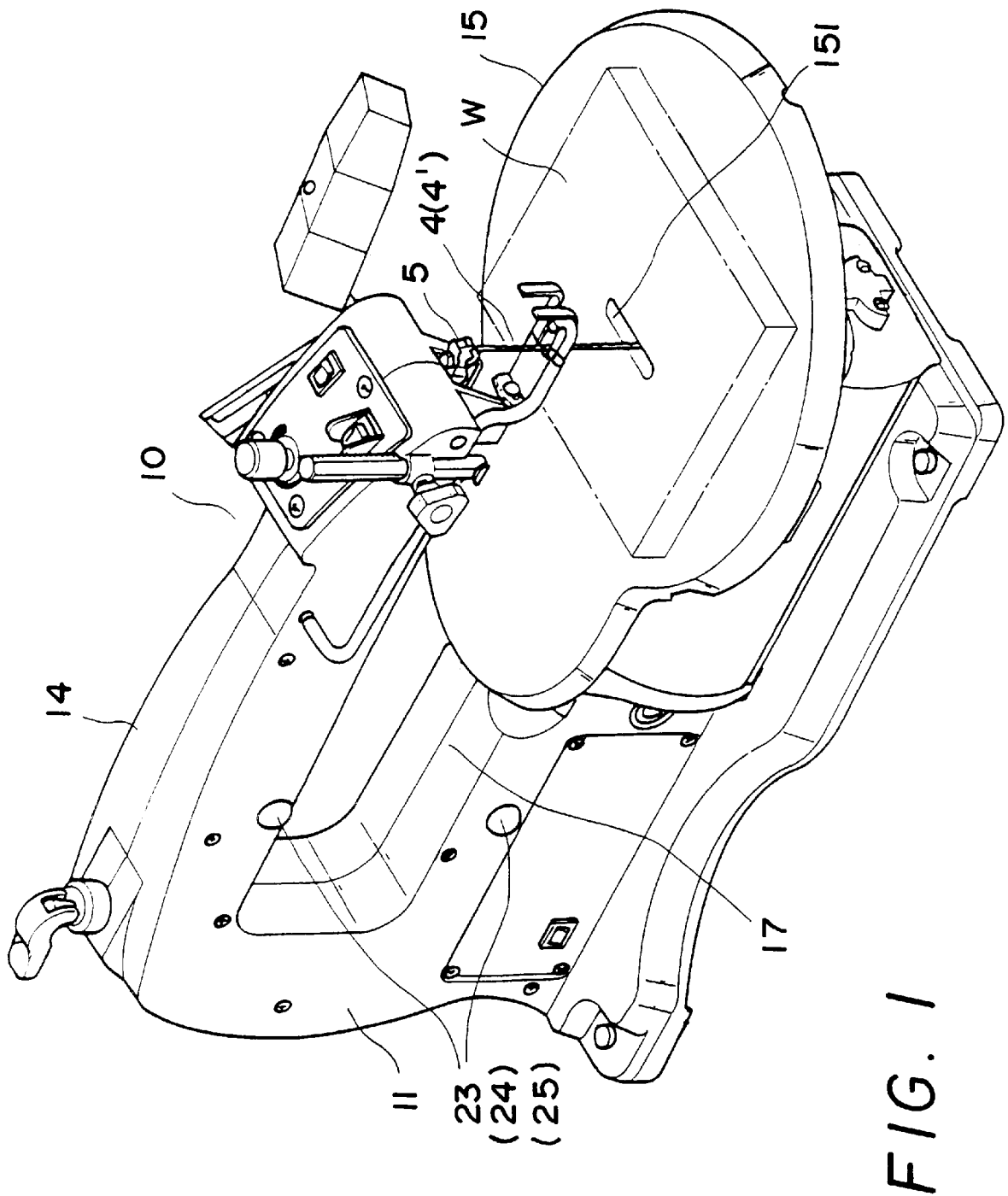
FIG. 1 is a perspective view showing the mounting position of the locking mechanism.
Figure 2:
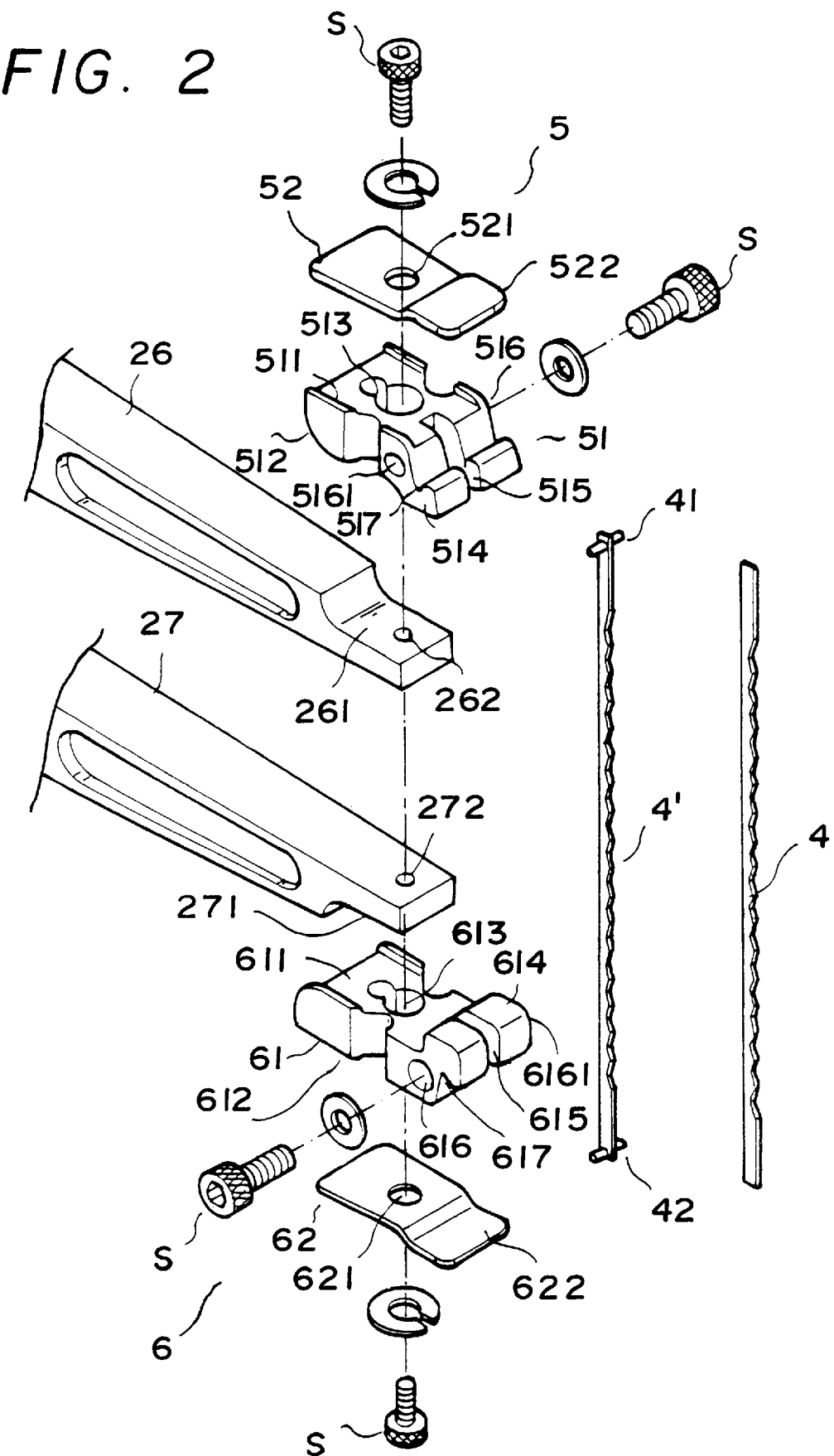
FIG. 2 is a partial, exploded, and perspective view of the locking mechanism.
Figure 3:
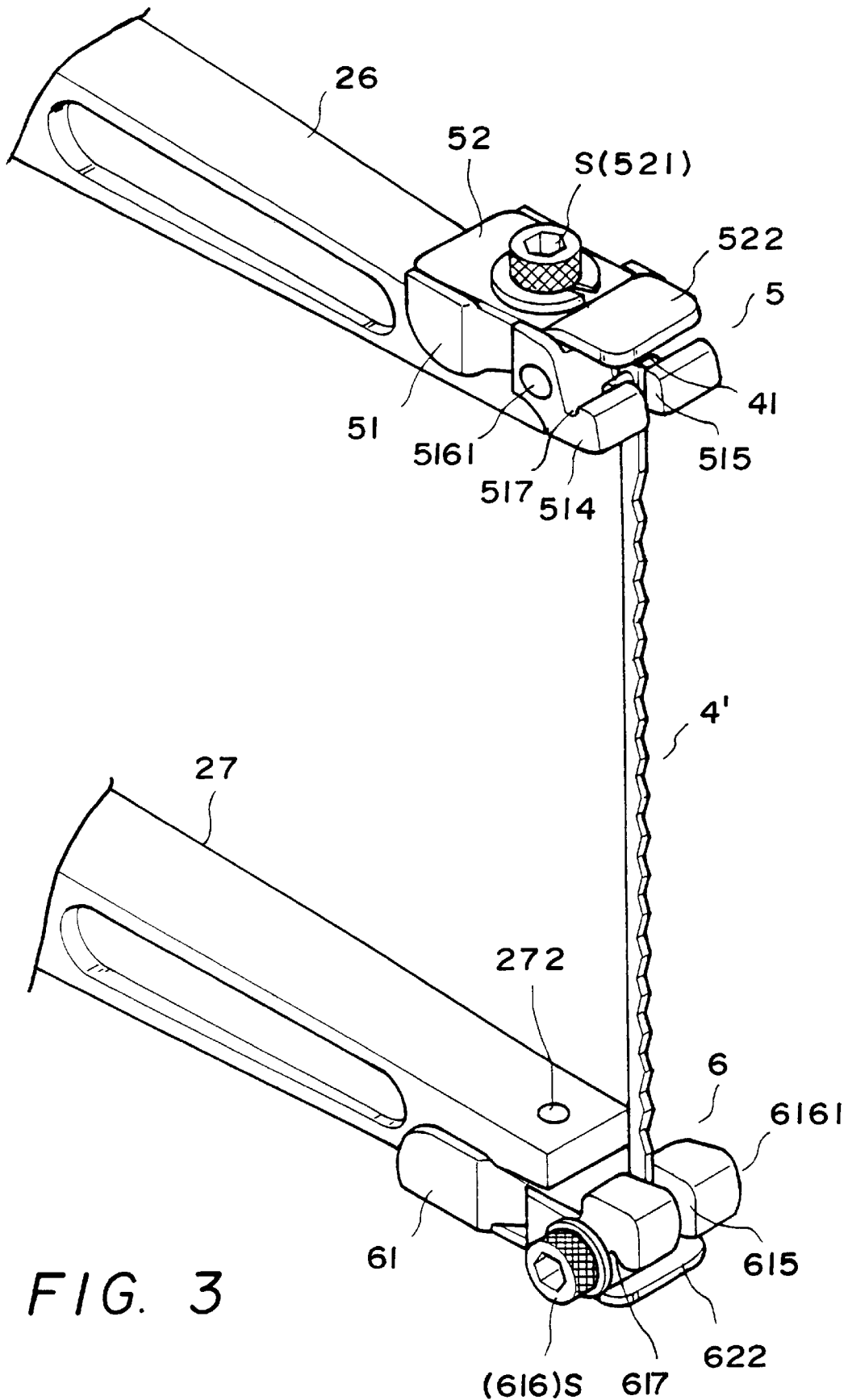
FIG. 3 is a partial, perspective view of the locking mechanism.

Referring to FIGS. 1, 2 and 3, the coping saw 10 incorporated with the locking mechanism made according to the present invention generally comprises a pair of left and right U-shape brackets 11 and 14 which are locked side-by-side thereon. The left and right U-shape brackets 11 and 14 jointly define an opening 17 in which a working table 15 is disposed therein. The working table 15 is provided with a rectangular opening 151 in which the blade 4 may pass through. Each side wall of the left and right brackets 11 and 14 is further provided with a shaft hole 23 and 24 respectively. Each of the shaft hole 23 and 24 is disposed with a bearing set 25 with which the upper and lower swinging arms 26 and 27 are rotationally mounted thereto. The blade 4(4') is bridged over the free ends of the swinging arms 26 and 27. The opposite ends of the upper and lower swinging arms 26 and 27 are interconnected with a linkage (not shown). The housing of the coping saw is provided with a driving motor and the output shaft of the motor is pivotally mounted with a locking rod which is in turn interconnected to the lower swinging arm 27. Accordingly, when the motor is rotated, the blade 4 will be oscillated to cut a workpiece W (as shown in dotted line in FIG. 1) which is disposed on the working table 15 by the repetitively moved upper and lower swinging arms 26 and 27. During the cutting, the working piece W can be readily moved along the cutting line on the working piece W by both hands of the operator.

The front end portion of the upper swinging arm 26 is provided with a reference surface 261 which is further provided with a threaded hole 262. The lower swinging arm 27 is also provided with a reference surface 271 in the front portion and which is also provided with a threaded hole 272.

A pair of positioning devices 5 and 6 are utilized to attach the blade 4 (4') onto the upper and lower swinging arms 26 and 27. The upper positioning device 5 includes an upper fixing block 51, upper pressing tab 52 and a plurality of locking elements or screws S. The rear upper portion of the upper fixing block 51 is provided with a recessed reference surface 511 and the rear lower portion is also provided with a reference surface 512. On the other hand, the rear portion of the fixing block 51 is also provided with a shaped hole 513. A stopping portion 514 is disposed in front of the recessed reference surface 512. The front edge of the fixing block 51 is provided with an slit 515 and a through hole 516 is disposed traverse and passed through the slit 515. The lower portion of the fixing block 51 is provided with a upper concave portion 517. The upper pressing tab 52 is provided with a through hole 521 at the rear portion and the front portion is provided with a bent portion 522.

The lower positioning device 6 is configured with a lower fixing block 61, a lower pressing tab 62 and a plurality of screws S. The lower fixing block 61 is provided with a recessed reference surface 611 in the rear upper portion. The rear bottom of the fixing block 61 is also provided with a lower recessed reference surface 612. The rear portion of the lower fixing block 61 is also provided with a shaped hole 613. A stopping portion 614 is disposed in front of the upper recessed reference surface 611. The front edge of the lower fixing block 61 is also provided with a slit 615 and a through hole 616 is traverse to and extends through the slit 615. The front lower portion of the lower fixing block 61 is provided with a lower concave portion 617. The lower pressing tab 62 is also provided with a through hole 621 and the front section is provided with a bent portion 622 which is directed downward.

In assembling, the upper fixing block 51 is attached to the upper swinging arm 26 by the engagement between the lower recessed reference surface 512 and the reference surface 261. Then the upper pressing tab 52 is fixedly seated into the upper recessed reference surface 511 and finally a set locking screw S is applied and which extends through the through hole 521, the shaped hole 513 of the upper fixing block 51 and finally locked into the threaded hole 262 of the upper swinging arm 26.

Similarly, the lower fixing block 61 is fixedly attached to the lower swinging arm 27 by the engagement between the upper recessed reference surface 611 and the reference surface 271. The lower pressing tab 62 is then fixedly seated onto the lower recessed reference surface 612 and then a set locking screw S is applied and which extends through the through hole 621 of the lower pressing tab 62, the shaped hole 613 of the lower fixing block 61 and finally locked into the threaded hole 272 of the lower swinging arm 27.

When both the upper and lower fixing blocks 51 and 61 are properly assembled, the blade 4 can be suitably disposed between the slit 515 of the upper fixing block 51 and the slit 615 of the lower fixing block 61. Then a locking screw S is suitably passed through the traverse hole 516 of the slit 515 and engaged into the threaded hole 5161, thereby compressing and clamping the upper end of blade 4 in slit 515. As a result, the upper end of the blade 4 is fixedly attached to the upper fixing block 51. Similarly, another locking screw S is passed through the traverse hole 616 of the slit 615 and is finally engaged into the threaded hole 6161 thereby compressing and clamping the lower and of blade 4 in slit 615. As a result, the lower end of the blade 4 is fixedly attached to the lower fixing block 61.

By the provision of the present invention, another variant of the blade 4' can be also attached to the upper and lower fixing blocks 51 and 61. This variant blade 4' has a cross end 41 (42). In mounting, the upper end of the blade 4' is disposed within the slit 515 such that the cross end 41 is firmly seated onto the upper concave portion 517. Then a locking screw S is applied through the through hole 516 of the upper block 51 and finally locked into the threaded hole 5161 thereby compressing and clamping the upper end 41 in slit 515. As a result, the upper end 41 of the blade 4' can be suitably supported and locked. Similarly, the lower end 42 of the blade 4' is also attached to the lower fixing block 61 in the same manner as the upper end 41. By this arrangement, the variant blade 4' is fixedly bridged between the upper and lower fixing blocks 51 and 61, as clearly shown in FIG. 4. By this arrangement, since the blade 4' can be fixedly and firmly supported and clamped between the upper and lower fixing blocks 51 and 61, the oscillating cutting movement of the blade 4' can be more efficiently and smoothly performed without any possibility of the blade 4 being removed from blocks 51 and 61.

From the forgoing description, it can be readily appreciated that both the blade 4 or the variant blade 4' which has cross end portions 41 and 42 can be suitably and firmly attached to the upper and lower fixing blocks 51 and 61 which in turn are attached to the upper and lower swinging arms 26 and 27 respectively. As a result, the cutting movement of the blade can be suitably performed.

While a particular embodiment of the present invention has been illustrated and described, it would be obvious to those skilled in the art that various other changes and modifications can be made without departing from the spirit and scope of the invention. It is therefore intended to cover in the appended claim all such changes and modifications that are within the scope of the present invention.

I claim:

1. A locking mechanism for a blade of a coping saw having a pair of upper and lower swinging arms, with each swinging arm having a front portion, the mechanism comprising:

(a) an upper reference surface at the front portion at the upper swinging arm, a lower reference surface at the front portion of the lower swinging arm, and a threaded hole formed in each reference surface;

(b) an upper positioning device mounted on the upper reference surface of the upper arm, the upper positioning device including an upper fixing block having a rear upper portion provided with an upper recessed surface, a rear lower portion provided with a lower recessed surface, a rear portion provided with a shaped hole, a stopping portion disposed in front of the recessed surfaces, a front edge having a slit formed therein, a threaded hole extending transversely through the front edge and the slit, and a lower portion provided with an upper concave portion, and an upper pressing tab having a rear portion provided with a through hole and a front portion provided with an upwardly directed bent portion;

(c) a lower positioning device mounted on the lower reference surface of the lower arm, the lower positioning device including a lower fixing block having a rear lower portion provided with a lower recessed surface, a rear upper portion provided with an upper recessed surface, a rear portion provided with a shaped hole, a stopping portion disposed in front of the recessed surfaces, a front edge having a slit formed therein, a threaded hole extending transversely through the front edge and the slit, and an upper portion provided with a lower concave portion, and a lower pressing tab having a rear portion provided with a through hole and a front portion provided with a downwardly directed bent portion;

(d) a first upper threaded fastener extending through the through hole of the upper pressing tab, shaped hole of the upper fixing block and threadedly engaged within the threaded hole of the upper reference surface for securing the upper positioning device to the front portion of the upper swinging arm, and a first lower threaded fastener extending through the through hole of the lower pressing plate, shaped hole of the lower fixing block and threadedly engaged within the threaded hole of the lower reference surface for securing the lower positioning device to the front portion of the lower swinging arm; and (e) a second upper threaded fastener threadedly engaged within the threaded transverse hole of the upper fixing block for clamping an upper end of a blade within the slit of the upper fixing block, and a second lower threaded fastener threadedly engaged within the transverse threaded hole of the lower fixing block for clamping the lower end of a saw blade within the slit of the lower fixing block.

* * * * *

UNITED STATES PATENT AND TRADEMARK OFFICE
Certificate

Patent No. 5,896,799                                                  Patented: April 27, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ruey-Zon Chen, Taichung County, Taiwan; Wayne Huang, Taichung County, Taiwan; George Ku, Taichung County, Taiwan; and Eric Lo, Taichung County, Taiwan.

Signed and Sealed this Second Day of September 2003.

ALLAN N. SHOAP
*Supervisory Patent Examiner*
Art Unit 3724